United States Patent [19]

Fujino

[11] Patent Number: 4,982,235
[45] Date of Patent: Jan. 1, 1991

[54] IMAGE SCAN APPARATUS

[75] Inventor: Takane Fujino, Fujisawa, Japan

[73] Assignee: International Business Machines Corp., Armonk, N.Y.

[21] Appl. No.: 527,004

[22] Filed: May 22, 1990

[51] Int. Cl.$^5$ .................. G03G 15/28; G03G 21/00
[52] U.S. Cl. ...................... 355/235; 355/75;
  355/230; 355/309; 358/497; 358/498
[58] Field of Search ............. 355/233, 235, 309, 308,
  355/75, 230; 271/267, 84, 114, 116; 358/497, 498

[56] References Cited

U.S. PATENT DOCUMENTS

| | | | |
|---|---|---|---|
| 3,947,111 | 3/1976 | Hoppner | 355/75 X |
| 4,561,771 | 12/1985 | Sugiura | 355/235 |
| 4,722,518 | 2/1988 | Wantanabe | 271/114 X |
| 4,865,305 | 9/1989 | Momiyama et al. | 271/116 |
| 4,893,196 | 1/1990 | Koshiyouji et al. | 358/497 X |

Primary Examiner—A. T. Grimley
Assistant Examiner—Stanzione, Patrick J.
Attorney, Agent, or Firm—Perman & Green

[57] ABSTRACT

The invention comprises an image scan apparatus wherein a simple document feed unit is provided for feeding a document to be scanned to a predetermined position on a glass platen. The document feed unit is mechanically coupled to an image sense unit which is reciprocally moved between a home position and a scan start position. The document feed unit includes a frictional roller which is in contact with the glass platen. A leading edge of the document is inserted by an operator at a home position between a frictional roller and the glass platen. The frictional roller is mounted on a shaft via a one-way clutch or one-way bearing. The one-way clutch inhibits the rotation of the frictional roller during its movement from the home position to a scan start position. The leading portion of the document is engaged by the frictional roller, and the document is fed to a predetermined position on the glass platen as the frictional roller and the image sense unit are moved to the scan start position. The one-way clutch allows the rotation of the frictional roller during a reverse movement from the scan start position back to the home position, while the document is being scanned. During this movement, the frictional roller freely rotates over the document without moving it.

6 Claims, 5 Drawing Sheets

HOME POSITION

IMAGE SCAN APPARATUS

FIELD OF THE INVENTION

This invention relates to a document scanner, and more particularly to an improved document feed mechanism for a document scanner.

BACKGROUND OF THE INVENTION

The prior art is replete with mechanisms for feeding a document into a predetermined position on a glass platen. In U.S. Pat. No. 3,844,552, an endless rubber belt is supported between two rollers, with one of the rollers driven by a drive source which includes a motor, gears, etc. The other roller is freely rotatable. Such feed mechanisms have been widely used as document feeders for copying machines. In such mechanisms, a wide rubber belt, which exhibits a high coefficient of friction, contacts the glass platen during an initial period of document feed, and causes a loss of power. To drive the rubber belt and overcome the power loss, a relatively powerful drive source is required. As a result, the size and weight of the feed mechanism is large, and its cost is high.

Small size and low cost image scan apparatus's have been developed for imaging documents. However, large and costly feed mechanisms are not suitable for such devices.

Accordingly, it is an object of this invention to provide an improved document feeder for an image scanner.

It is another object of this invention to provide a low cost, low energy consumption, document feeder.

SUMMARY OF THE INVENTION

The invention comprises an image scan apparatus wherein a simple document feed unit is provided for feeding a document to be scanned to a predetermined position on a glass platen. The document feed unit is mechanically coupled to an image sense unit which is reciprocally moved between a home position and a scan start position. The document feed unit includes a frictional roller which is in contact with the glass platen. A leading edge of the document is inserted by an operator at a home position between a frictional roller and the glass platen. The frictional roller is mounted on a shaft via a one-way clutch or one-way bearing. The one-way clutch inhibits the rotation of the frictional roller during its movement from the home position to a scan start position. The leading portion of the document is engaged by the frictional roller, and the document is fed to a predetermined position on the glass platen as the frictional roller and the image sense unit are moved to the scan start position. The one-way clutch allows the rotation of the frictional roller during a reverse movement from the scan start position back to the home position, while the document is being scanned. During this movement, the frictional roller freely rotates over the document without moving it.

DETAILED DESCRIPTION OF THE INVENTION

An image bearing surface of a document to be scanned is placed on a glass platen of an image scan apparatus. An image sense unit including a light source and image sensor, such as a CCD (Charge Coupled Device) image sensor, is mounted within the image scan apparatus. The image sense unit is reciprocally moved. That is, the image sense unit is moved from a home position to a scan start position, during which time the document image is not sensed. Then the image sense unit is moved back from the scan start position to the home position, during which time the document image is scanned by the image sense unit.

A document feed unit is mechanically coupled to the image sense unit. The document feed unit includes a frictional roller mounted on a fixed shaft through a one-way clutch and in contact with a glass platen. The document feed unit further includes a freely rotatable roller and a document edge sensor. A leading edge of a document is inserted by an operator between the frictional roller (which is stationary at the home position) and the glass platen. The one-way clutch inhibits the rotation of the frictional roller during its movement from the home position to the scan start position. Thus, the leading portion of the document is caught or engaged by the non-rotatable frictional roller, and the document is moved, as both the image sense unit and document feed unit are moved toward the scan start position.

The document is thereby moved to a predetermined position on the glass platen as both the image sense unit and document feed unit move to the scan start position, and stop.

The one way clutch allows the rotation of the frictional roller during its return movement from the scan start position to the home position. As a result, the frictional roller freely rotates over the document without moving it, while the stationary document is scanned by the image sense unit.

In another aspect of the present invention, the document feed unit is pivotally mounted on a guide shaft which extends in the direction of the movement of the image sense unit. Thus, at the home position, the document feed unit is pivotable between a document feed position where it rests on the glass platen, and a raised position at which the document feed unit is raised from the glass platen. Means are provided at the home position which couple the document feed unit with the image sense unit or disengage the document feed unit from the image sense unit.

Figure 1:
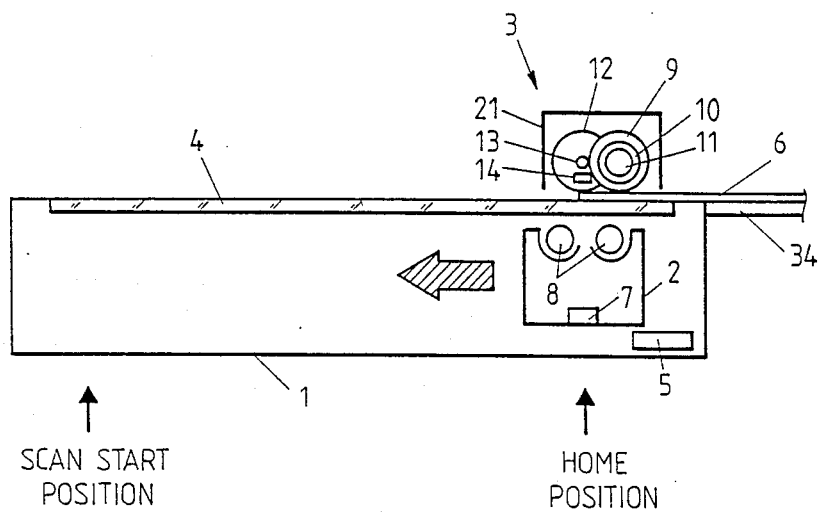
FIGS. 1 and 2 are schematic side views of the invention which aid in understanding its operation.

Referring to FIG. 1, an image scan apparatus 1 includes an image sense unit 2, a document feed unit 3, a glass platen 4, and a control unit 5. Image scan apparatus 1 also includes a power supply, a driving mechanism including an electric motor and guide rails etc., for moving image sense unit 2 (not shown). A plate 34 is also mounted on image scan apparatus 1. Image sense unit 2 includes an image sensor 7, such as a CCD image sensor, and a light source 8.

Document feed unit 3 is shown in FIGS. 1, 2, 3, and 4, and includes a frame 15, a cover 21, a shaft 11 fixed to frame 15, a frictional roller 9 mounted on shaft 11 through a one-way clutch or one-way bearing 10, members 16 and 17 pivotally mounted on shaft 11, a shaft 13 mounted on members 16 and 17, rollers 12 rotatably mounted on shaft 13, and a document edge sensor 14. Document edge sensor 14 is mounted on a support member, not shown. Frame 15 is mechanically coupled to image sense unit 2, so that document feed unit 3 is moved along with image sense unit 2. That is, document feed unit 3 does not require its own drive source. The drive force for document feed unit 3 is supplied from image sense unit 2 though a mechanical coupling therebetween. Document feed unit 3 and image sense unit 2 reside at a home position during a wait period, as shown in FIG. 1.

During the document scan operation, document 6 is inserted (at the home position) between frictional roller 9 and glass platen 4 by an operator (see FIG. 1). Frictional roller 9 rotates only in the clockwise direction due to the action of one-way clutch 10. Rollers 12 freely rotate in both clockwise and counter clockwise directions. This action causes the leading edge of document 6 to be moved below document edge sensor 14. Document edge sensor 14 includes a light source, such as a light emitting diode and a light sense element.

When the leading edge of document 6 is advanced to a position just below document edge sensor 14, light reflected from the leading edge of document 6 is sensed by the light sense element, and the sensed signal is supplied to control unit 5. Control unit 5 responds to the sensed signal by activating the electric motor to start the movement of both image sense unit 2 and document feed unit 3 towards the scan start position.

One-way clutch 10 inhibits rotation of frictional roller 9. The frictional force between frictional roller 9 and document 6 is larger than the frictional force between document 6 and glass platen 4. Thus, the leading portion of document 6 is engaged or caught by non-rotated frictional roller 9, and document 6 is moved on glass platen 4 towards the scan start position, as frictional roller 9 is moved. When image sense unit 2 reaches the scan start position, a left end position sensor, not shown, generates a sense signal. Control unit 5 responds to the sense signal to deactivate the electric motor to stop image sense unit 2, document feed unit 3, and document 6 at the scan start position, whereby document 6 is placed in the scan position.

Figure 2:
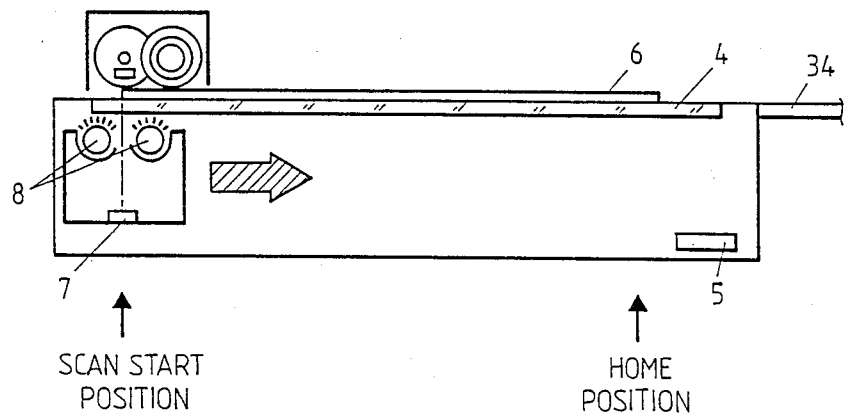
Figure 3:
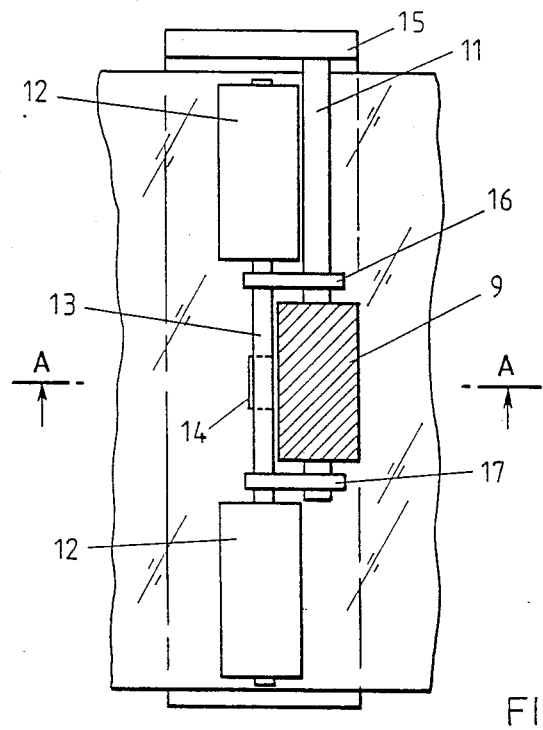
FIG. 3 is a plan view which shows details of rollers used with the invention.
Figure 4:
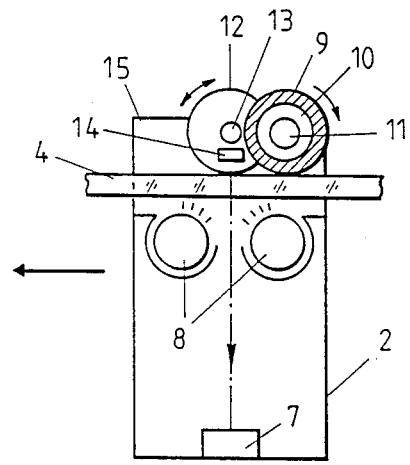
FIG. 4 is a sectional view of FIG. 3 along line A—A.

Control unit 5 now activates the electric motor in an opposite direction to move both image sense unit 2 and document feed unit 3 from the scan start position to the home position, and activates the operation of image sense unit 2, as shown in FIG. 2. More particularly, light source 8 is turned on and image sensor 7 senses the reflected light from the image of document 6.

As image sense unit 2 and document feed unit 3 are moved towards the home position, the image of the document 6 is sensed by image sense unit 2. During such movement, one-way clutch 10 allows a clockwise rotation of frictional roller 9 over document 6, and does not move it from the scan position. When image sense unit 2 reaches the home position, a right end position sensor, not shown, generates a sense signal. Control unit 5 responds to the sense signal to deactivate the electric motor to stop both image sense unit 2 and document feed unit 3 at the home position.

Data representing the image of document 6 is stored in a memory, not shown, in control unit 5, and is utilized for image processing. The speed of movement of units 2 and 3 from the home position to the scan start position is about 30 cm/sec., while the scanning speed of units 2 and 3 from the scan start position to the home position is about 15 cm/sec.

Figure 5:
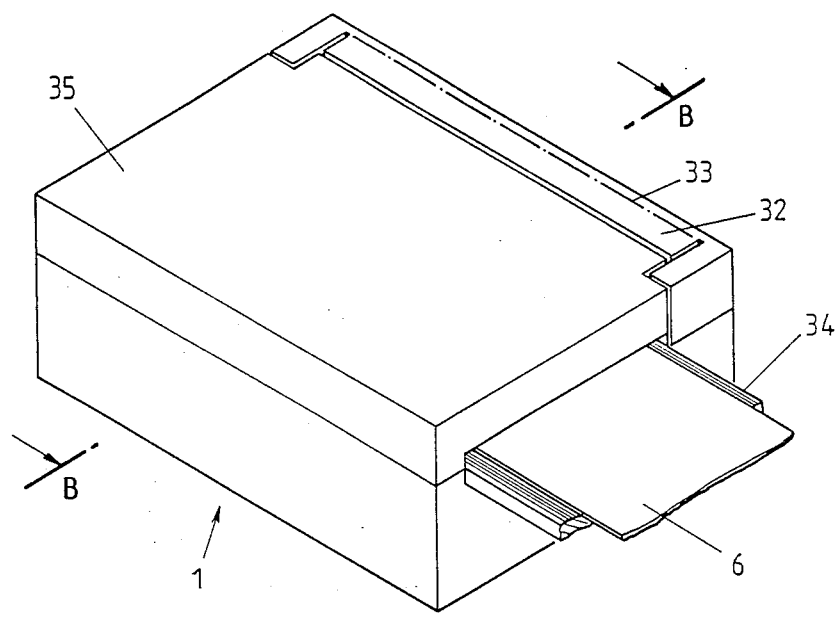
FIG. 5 is a perspective view of another embodiment of the invention.
Figure 6:
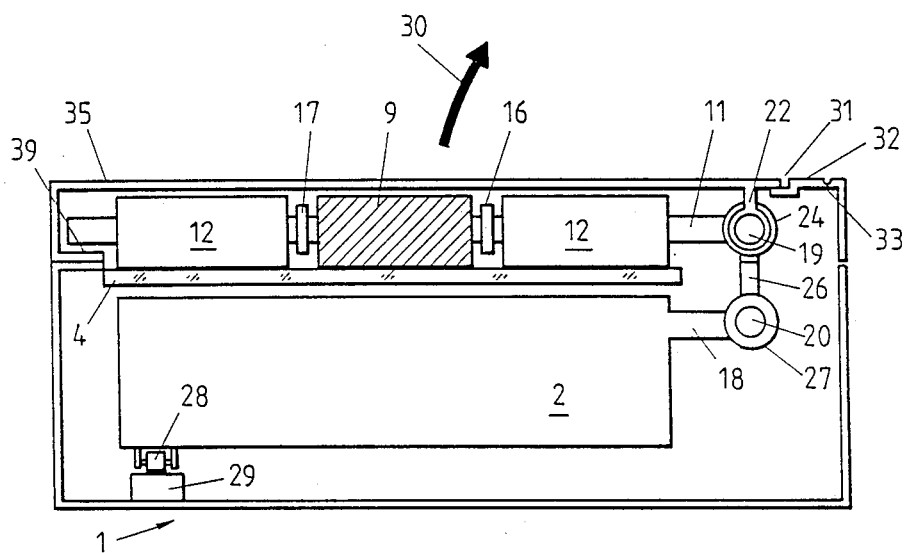
FIG. 6 is a sectional view of FIG. 5 along line B—B.

FIGS. 5, 6, 7, and 8 show another embodiment of the invention wherein document feed unit 3 is selectively coupled to image sense unit 2. FIG. 6 shows a cross section viewed at line B—B in FIG. 5. A cover 35 is pivotally mounted on a guide shaft 19 which passes through members 22 and coupling sleeves 23 positioned at right and left sides of image scan apparatus 1. Guide shafts 19 and 20 extend in the direction of the movement of image sense unit 2 and are fixedly mounted on a frame, not shown, of image scan apparatus 1. Shaft 11 of document feed unit 3 is attached to a sliding sleeve 24 which is slidably mounted on guide shaft 19. A tab 25 extends from sliding sleeve 24. Tab 25 selectively engages a receiving member 26 which extends from a sliding sleeve 27 that is slidably mounted on guide shaft 20. A support member 18 couples sliding sleeve 27 to image sense unit 2. A roller 28 is mounted on the bottom of image sense unit 2 to support image sense unit 2 on a rail 29.

Figure 7:
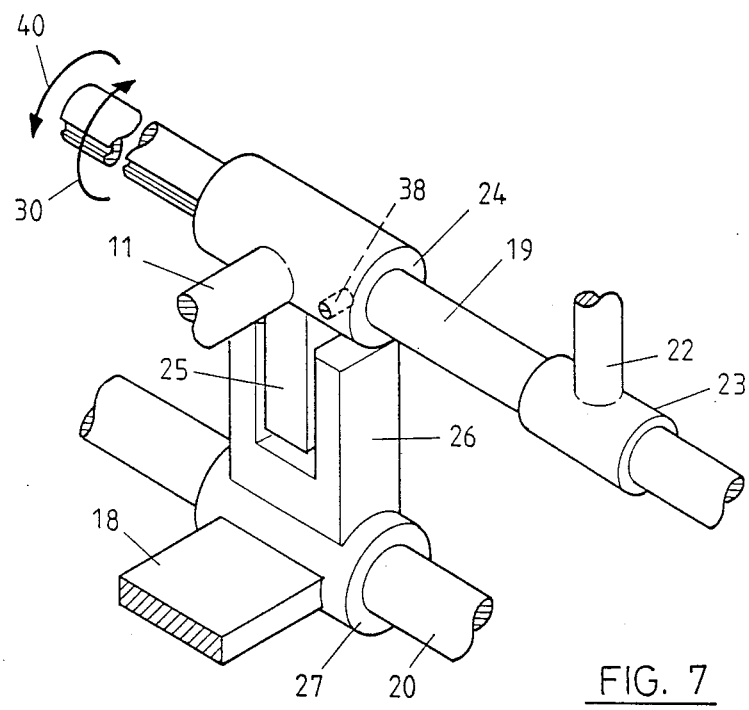
FIGS. 7 and 8 are perspective views of a subassembly of the invention.
Figure 8:
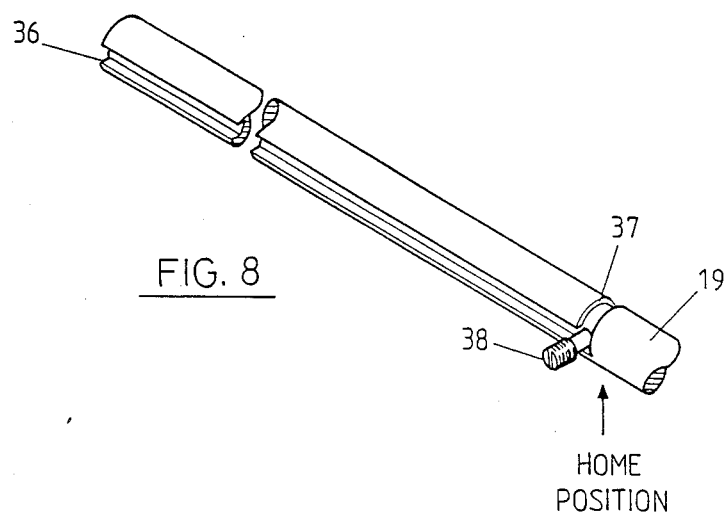

Referring to FIGS. 7 and 8, a horizontal channel 36 is formed in guide shaft 19, and a channel 37 extends from channel 36. Channel 37 is formed in the circumference of guide shaft 19. Channel 37 continues to the right end of channel 36. A screw 38 is mounted in sliding sleeve 24 and is extended to the channel, as shown in FIG. 8. Channel 37 is formed at the home position of image sense unit 2 and document feed unit 3. Screw 38 is positioned at the right end of channel 36, when both units 2 and 3 are positioned at the home position.

When cover 35 is closed and image sense unit 2 is positioned at the home position, frictional roller 9 and rollers 12 are placed on glass platen 4, as shown in FIG. 6. Tab 25 of document feed unit 3 engages with receiving member 26 of image sense unit 2, and screw 38 is positioned in the right end of channel 36 and the lower most end of channel 37.

When document 6 is inserted by the operator, image sense unit 2, together with document feed unit 3, is moved from the home position to the scan start position. The leading edge portion of document 6 is caught by frictional roller 9 and is moved to the scan position on glass platen 4. Both units 2 and 3 are then moved from the scan start position back to the home position and scan document 6 while it rests in the scan position on glass platen 4.

When cover 35 is opened to scan a book, a portion 39 of cover 35 engages with the left end of shaft 11, and screw 38 in sleeve 24 is moved in channel 37. Document feed unit 3 is then pivoted around guide shaft 19 in a clockwise direction, as indicated by arrow 30 in FIGS. 6 and 7, so that tab 25 of document feed unit 3 is disengaged from receiving member 26 of image sense unit 2.

A counter-balance, not shown, for keeping cover 35 and document feed unit 3 in the raised position, is mounted within image scan apparatus 1. During scan operations of a book type document, document feed unit 3 is not moved. When a scan of a book type document has been completed, image sense unit 2 and its receiving member 26 are stopped at the home position, and cover 35 and document feed unit 3 are rotated in the clockwise direction, as shown by arrow 40. As a result, screw 38 is moved in channel 37, and tab 25 of document feed unit 3 engages with receiving member 26 of image sense unit 2.

Referring to FIGS. 5 and 6, a portion 32 is provided which is pivotally moved around a recess 33. When cover 35 is opened, an end portion 31 of cover 35 moves portion 32 in a counter clockwise direction around recess 33. The engagement of cover 35 and portion 32 prevents dust from being introduced into the apparatus.

Figure 9:
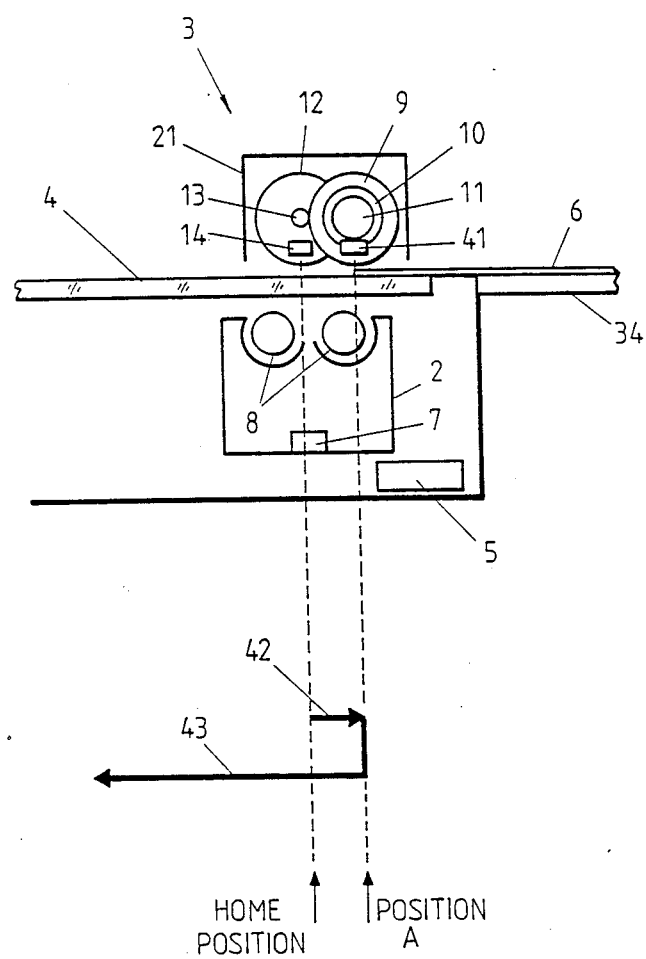
FIG. 9 is a schematic side view of showing the operation of the other embodiment.

FIG. 9 shows another embodiment of the invention wherein an additional document edge sensor 41 is mounted. Document edge sensor 41 is the same as document edge sensor 14. When the leading edge of document 6, inserted by the operator, reaches position A, document edge sensor 6 generates a sense signal which is supplied to control unit 5. Control unit 5 responds to the sense signal to move both image sense unit 2 and document feed unit 3 in the direction shown by arrow 42 from the home position. During such movement, frictional roller 9 and rollers 12 rotate in a clockwise direction on document 6, and it stays in the position shown in FIG. 9. When document edge sensor 14 detects the leading edge of document 6, sensor 14 generates a sense signal. Control unit 5 responds to the sense signal by stopping the movement of both units 2 and 3 at position A, and starting the movement of both units 2 and 3 in the direction shown by arrow 43 from position A to the scan start position.

Document 6, caught by frictional roller 9, is moved to the scan start position. When both units 2 and 3 reach the scan start position, control unit 5 stops their movement and starts the movement of both units 2 and 3 from the scan start position back to the home position. In this embodiment, a backward movement, as shown by arrow 43, is added. The purpose of the additional movement is to cause a thin document to be precisely caught by frictional roller 9.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. An image scan apparatus including home and scan start positions comprising:
    a glass platen for receiving an image bearing surface of a document between said positions;
    document feed means movable between said home and scan start positions and vice versa, said document feed means including a frictional roller contacting said glass platen and mounted on a shaft; and
    one-way clutch means coupled to said shaft for inhibiting the rotation of said frictional roller during movement of said document feed means from said home position to said scan start position, and for allowing rotation of said frictional roller during movement of said document feed means from said scan start position to said home position.

2. The image scan apparatus as recited in claim 1, further comprising:
    image sense means, movable between said home position and said scan start position, and including a light source for directing light to said image bearing surface and an image sensor for sensing light reflected from said image bearing surface.

3. The image scan apparatus as recited in claim 2, wherein said image sense means senses said image bearing surface during movement from said scan start position to said home position.

4. The image scan apparatus as recited in claim 2, wherein said document feed means includes freely rotatable roller means and a document edge sensor.

5. The image scan apparatus as recited in claim 2, further comprising:
    a guide shaft which extends in the direction of movement of said image sense means;
    pivot means for mounting said document feed means about said guide shaft, to enable said document feed means to pivot around said guide shaft between a document feed position and a raised position, when at the home position; and
    means for engaging and disengaging said document feed means in said document feed position, with and from said image sense means.

6. The image scan apparatus as recited in claim 2, further comprising:
    means coupling said document feed means and image sense means for simultaneous movement.

* * * * *